Dec. 17, 1968  A. G. BODINE, JR  3,416,632
BEAT FREQUENCY SONIC TECHNIQUE AND APPARATUS
FOR USE IN SEISMIC SURVEYS
Filed Oct. 20, 1966  6 Sheets-Sheet 2

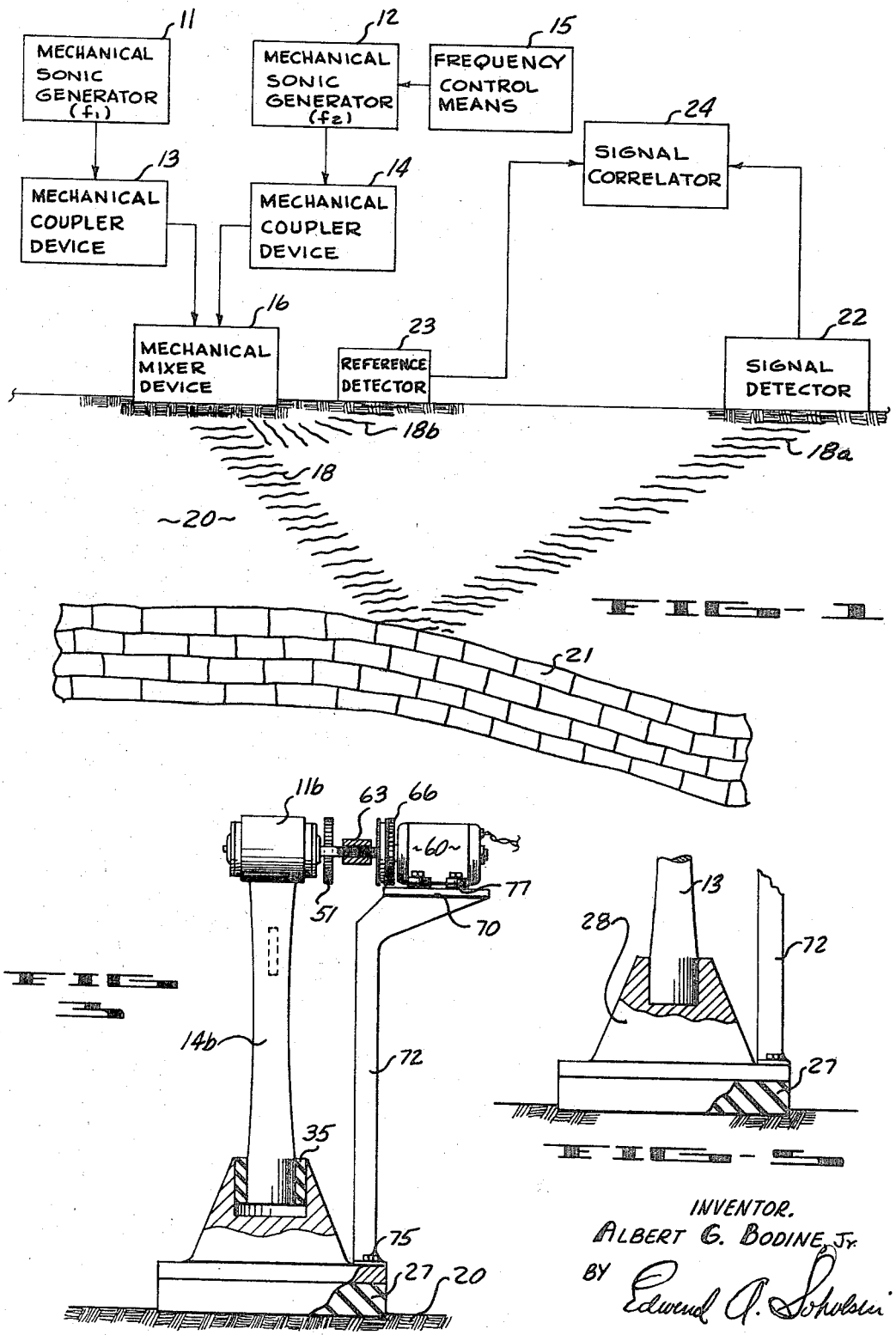

INVENTOR.
ALBERT G. BODINE, Jr.
BY
ATTORNEY

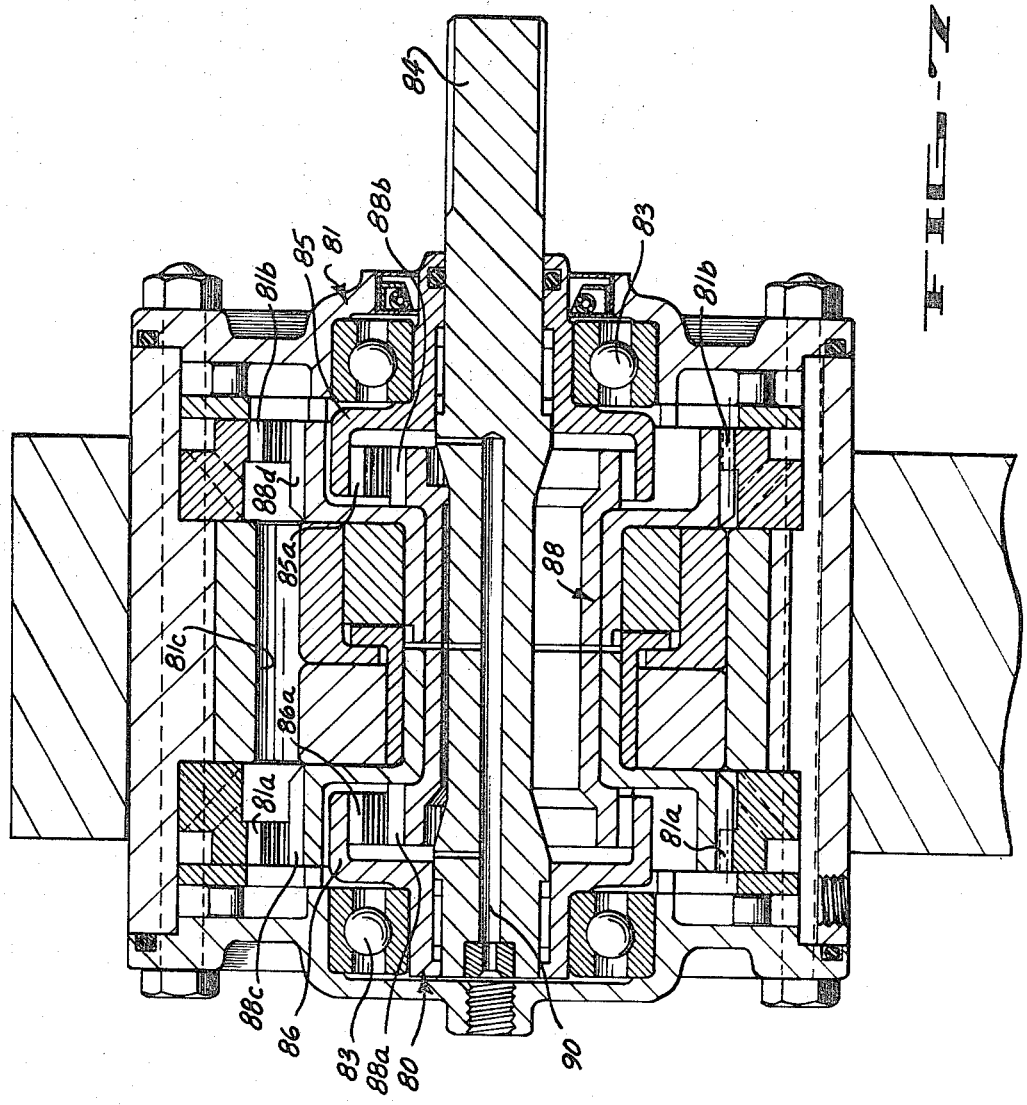

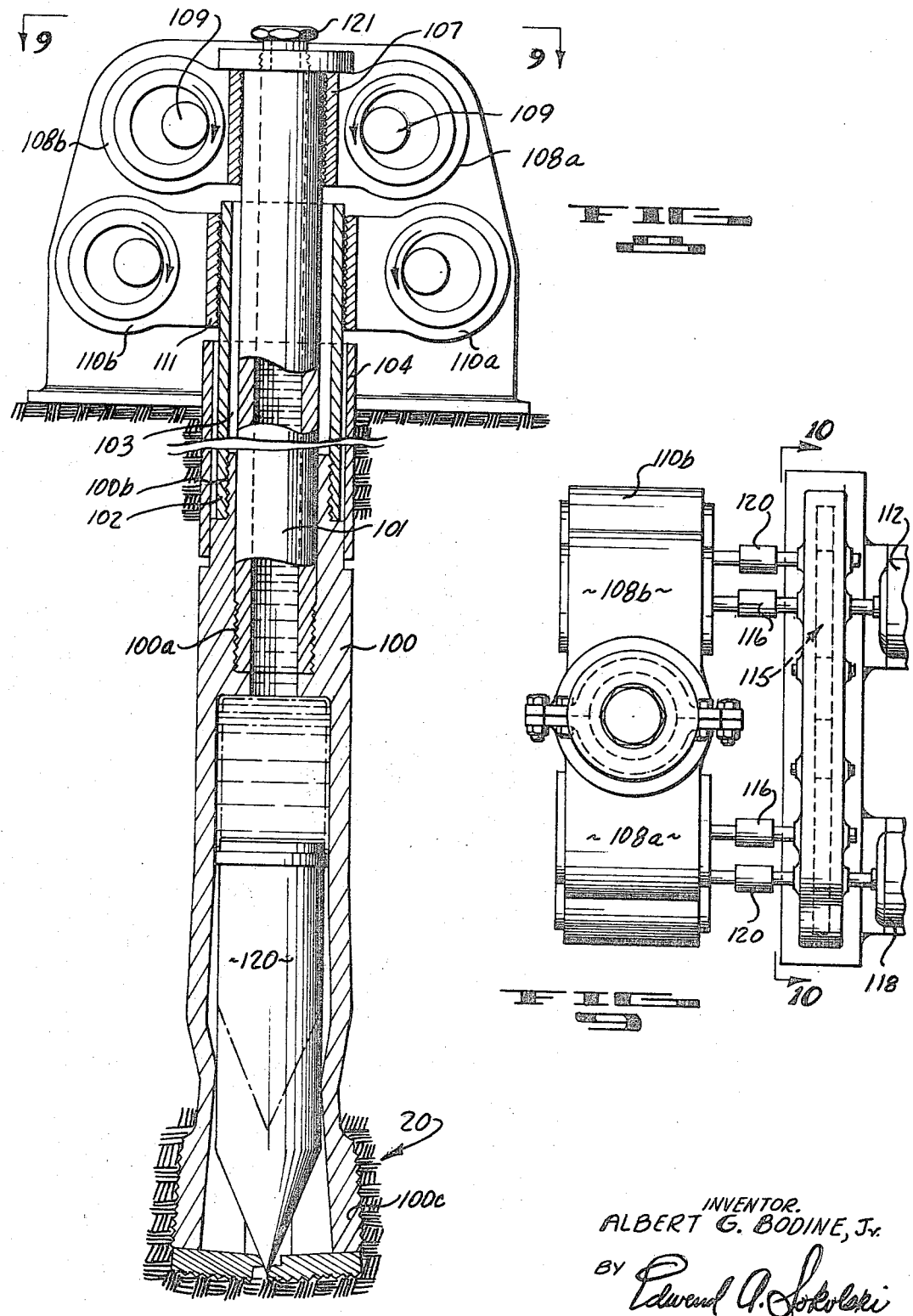

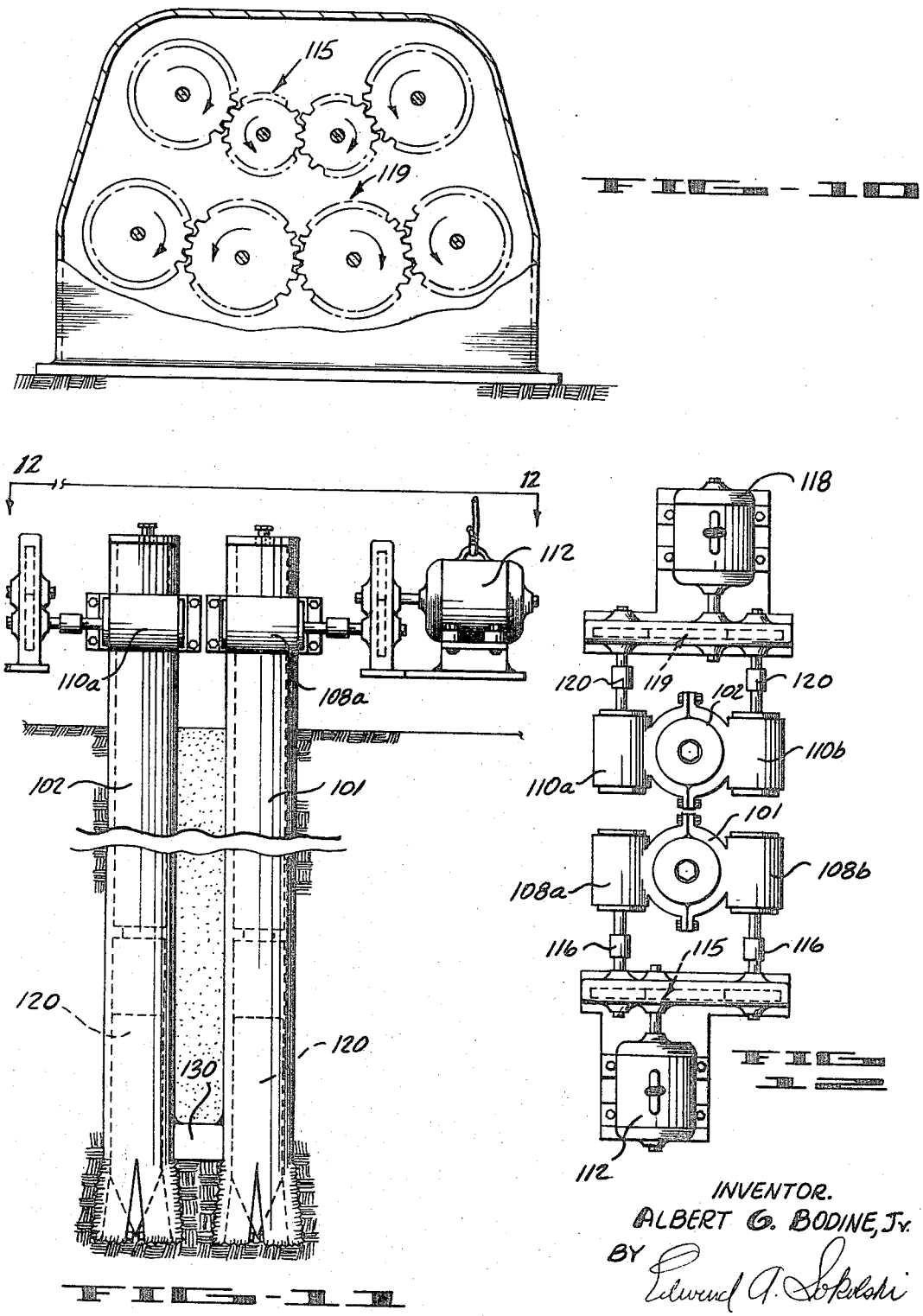

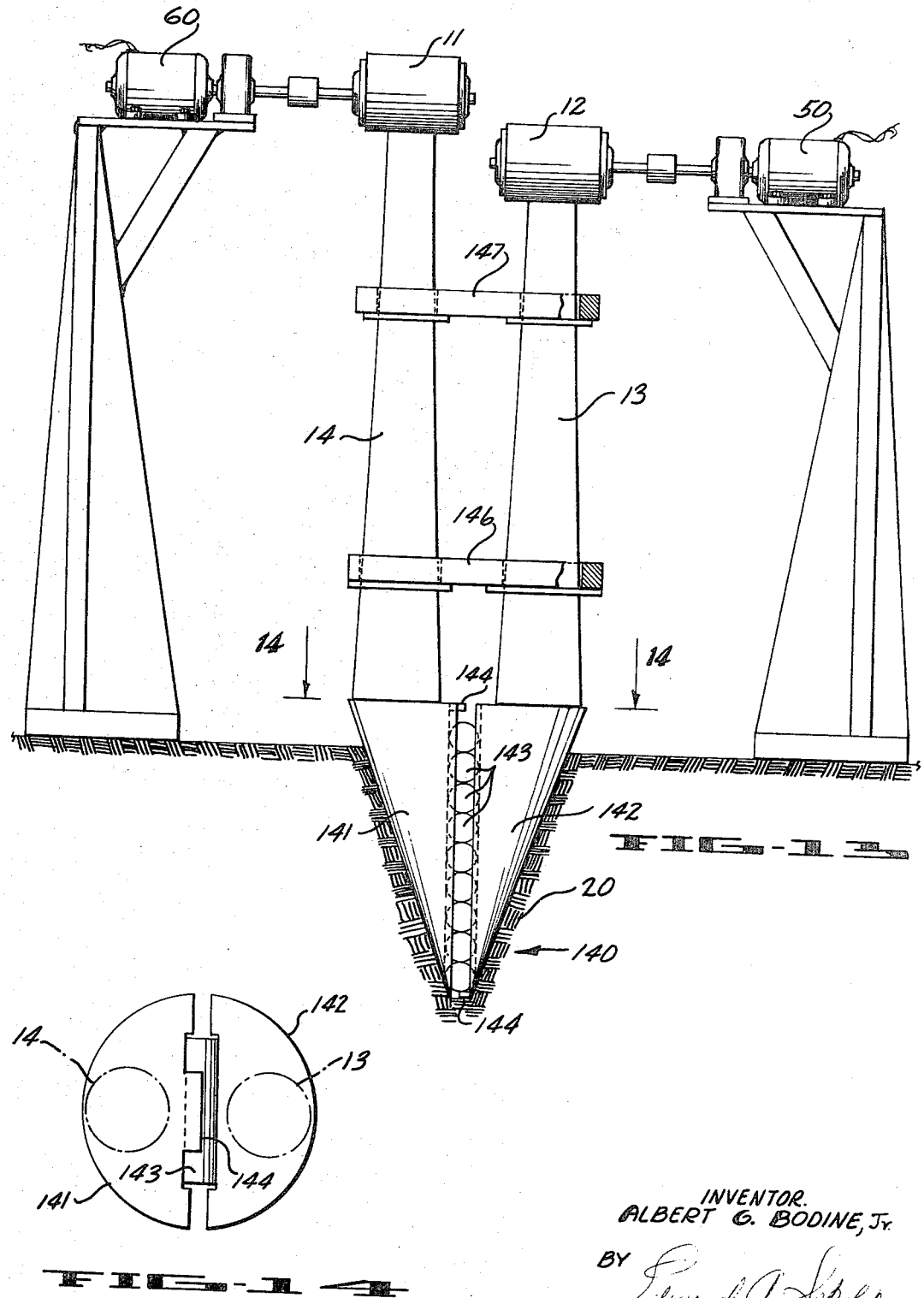

United States Patent Office 3,416,632
Patented Dec. 17, 1968

3,416,632
BEAT FREQUENCY SONIC TECHNIQUE AND
APPARATUS FOR USE IN SEISMIC SURVEYS
Albert G. Bodine, Jr., 7877 Woodley Ave.,
Van Nuys, Calif. 91406
Filed Oct. 20, 1966, Ser. No. 588,031
10 Claims. (Cl. 181—.5)

ABSTRACT OF THE DISCLOSURE

First and second mechanical sonic generators which generate high level sonic energy at frequencies substantially higher than and which differ by a desired seismic transmission frequency, have their outputs coupled to resonant vibration systems. The outputs of the resonant vibration systems are mixed in a nonlinear device to obtain a beat frequency difference signal which is at the desired transmission frequency, this difference signal being coupled into the ground for use in seismic survey work.

This invention relates to a method and devices utilizing beat frequency techniques for generating sonic energy for use in seismic surveys, and more particularly to such a method and devices in which orbiting-mass oscillators are utilized in conjunction with resonant vibration systems to generate high-level sonic energy.

In making seismic surveys, sonic energy is transmitted into the ground and the sonic echos reflected back by the geological strata received and analyzed, such analysis providing an indication of the nature of such strata. In view of the high attenuation characteristics of most earthen material, fairly high amounts of sonic power are needed to attain the signal-to-noise ratio necessary to make an effective survey of the strata at any significant depth below the surface. Electronic and electrical sonic generators are generally relatively inefficient in their operation at the low frequencies and high power levels necessary for effective seismic survey work, and therefore most prior art systems make use of explosive charges to generate the sonic signals. In my Patent No. 2,745,507, apparatus which utilizes a type of orbiting-mass oscillator to generate the necessary high-power sonic energy is described as incorporated into a seismic survey system. The sonic energy generation system of this patent while offering distinct advantages over systems of the prior art was found to have shortcomings in certain aspects. In making seismic surveys, the frequency of the transmitter wave is desirably swept over a band of frequencies to aid in the determination of the nature of the earthen formation; this in view of the fact that more information is thus applied, and also because different types of earthen material reflect differently at different signal frequencies. With the very low-frequency sonic signals utilized in seismic surveys, it was found to be difficult to obtain the desired frequency sweep and at the same time maintain high-efficiency resonant operation, or at least close to resonant opertaion, of the vibration system. This meant that a compromise had to be made either in the range of the sweep frequency utilized or in the maintenance of optimum resonant operation throughout the sweep frequency range. Further, in certain instances of deep application of signal serious interference problems to the receiving system were encountered from high-level sonic signals transmitted by the sonic generator at or near the surface of the ground.

The technique and apparatus of this invention overcome the aforementioned shortcomings by providing means for generating two high-level sonic waves at frequencies substantially higher than the seismic transmission frequency and then beating these two signals together in a nonlinear environment to obtain a beat frequency difference signal at the desired transmission frequency. Means are also provided to vary the frequency of one of the sonic energy sources sufficiently to obtain an adequate frequency sweep at the beat frequency; such frequency variation however being only a small fraction of the basic frequency of the outputs of the particular sonic generators. Thus a relatively large percentage variation in the seismic transmission frequency can be achieved with a relatively small percentage variation in thte frequency of one of the sonic generators. In certain embodiments of the device of the invention, the mixing action is achieved in a nonlinear medium or coupling right at the surface of the earth. In other embodiments of the device of the invention, the mixing action is achieved some distance from the surface of the earth with earthen material of the ground itself providing the nonlinear mixing medium. Orbiting-mass oscillator means are utilized in both types of embodiments in conjunction with resonant vibration systems to provide high-level sonic energy to generate the beat frequency signal in the mixing medium. Thus, the technique and apparatus of this invention enables the attainment of a proper frequency sweep without sacrificing efficient resonant operation of the sonic generation system.

It is therefore an object of this invention to provide an improved technique and apparatus for generating sonic energy for use in seismic survey work.

It is a further object of this invention to enable the attainment of an adequate frequency sweep in a sonic generator for use in seismic survey work wihout sacrificing efficient resonant operation of such generator.

It is another object of this invention to minimize interfering clutter signals in a seismic survey system.

It is still another object of this invention to provide means for generating a low-frequency sonic signal for use in seismic survey apparatus by beating together two substantially higher frequency sonic signals.

Other objects of this invention will become apparent from the following description taken in connection with the accompanying drawings in which:

FIG. 1 is a block diagram illustrating the general features of the technique of this invention;

FIG. 2 is an elevation view of a first embodiment of the device of the invention;

FIG. 3 is a view taken along the plane indicated by 3—3 in FIG. 2;

FIG. 6 is a view taken along the plane indicated by 6—6 in FIG. 4;

FIG. 7 is a cross-sectional view of an oscillator unit that may be utilized in the device of the invention;

FIG. 8 is an elevational view in cross section of a third embodiment of the device of the invention;

FIG. 9 is a view taken along the plane indicated by 9—9 in FIG. 8;

FIG. 10 is a view taken along the plane indicated by 10—10 in FIG. 9;

FIG. 11 is an elevational view of a fourth embodiment of the device of the invention;

FIG. 12 is a view taken along the plane indicated by 12—12 in FIG. 11;

FIG. 13 is an elevational view of a fifth embodiment of the device of the invention; and FIG. 14 is a cross-sectional view taken along the plane indicated by 14—14 in FIG. 13.

Figure 4:
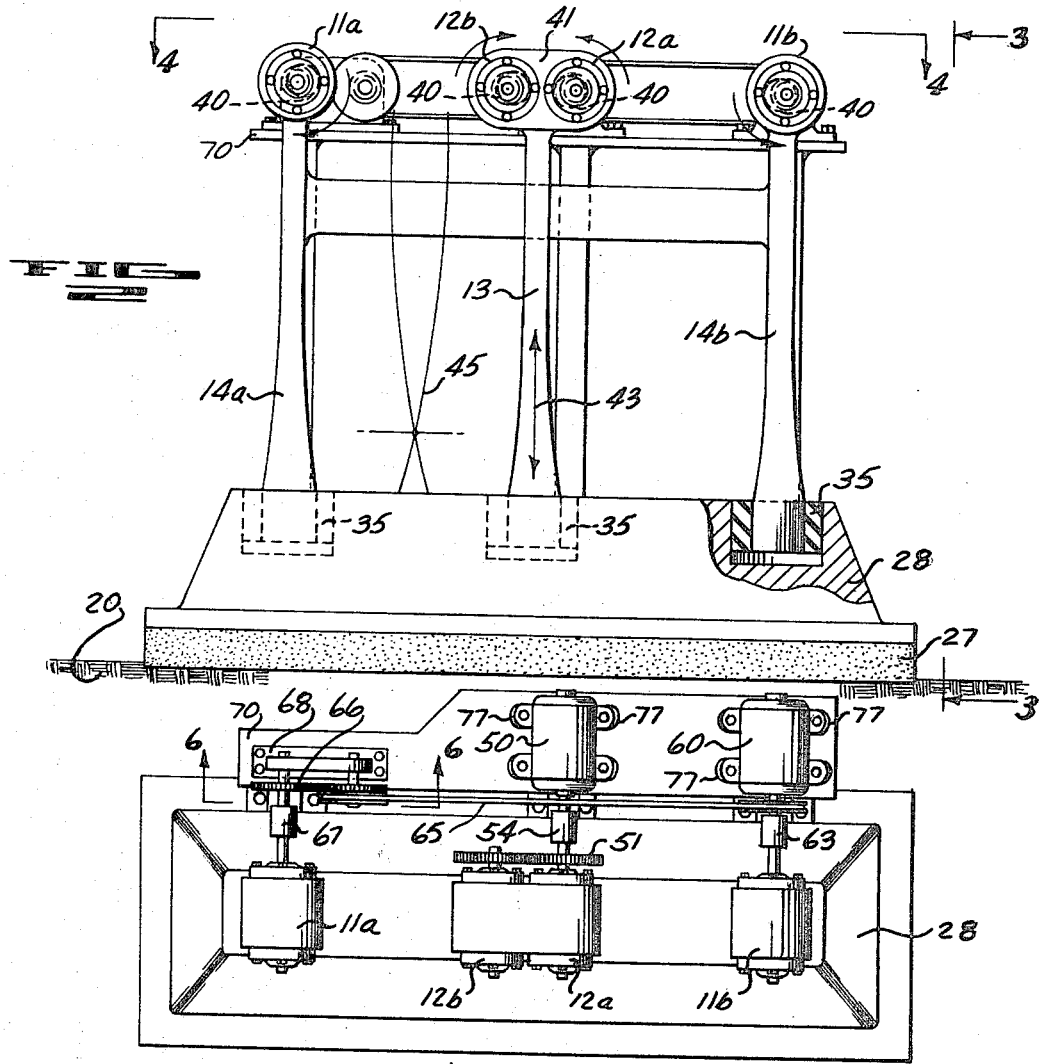
FIG. 4 is a view taken along the plane indicated by 4—4 in FIG. 2.

It has been found most helpful in analyzing the operation of the device of this invention to analogize the acoustically vibrating circuit involved to an equivalent electrical circuit. This sort of approach to analysis is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin \omega t$, ($\omega$ being equal to $2\pi$ times the frequency of vibration), that $$Z_m = R_m + j\left(\omega M - \frac{1}{\omega C_m}\right) = \frac{F_o \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power for effectively surveying the geological strata. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high-amplitude vibration by minimizing the effect of friction in the circuit and/or maximizing the effect of mass in such circuit.

In considering the significance of the parameters described in connection with Equation 1, it should be kept in mind that the total effective resistance, mass, and compliance in the acoustically vibrating circuit are represented in the equation and that these parameters may be distributed throughout the system rather than being lumped in any one component or portion thereof.

It is also to be noted that orbiting-mass oscillators are utilized in the devices of the invention that automatically adjust their output frequency and phase to maintain resonance with changes in the characteristics of the load. Thus, in the face of changes in the effective mass and compliance presented by the load with changes in the conditions of the surrounding earthen material as it is sonically excited, the system automatically is maintained in optimum resonant operation by virtue of the "lock-in" characteristic of applicant's unique orbiting-mass oscillators. The vibrational output from such orbiting-mass oscillators may be generated along a controlled predetermined coherent path to provide maximum output along a desired axis. The orbiting-mass oscillator automatically changes not only its frequency but its phase angle and therefore its power factor with changes in the resistive impedance load to assure optimum efficiency of operation at all times.

Referring now to FIG. 1, a schematic diagram illustrating the basic technique of the invention is shown. Mechanical sonic generator 11, which may comprise orbiting-mass oscillators, generates sonic energy at a first frequency $f_1$, which may be of the order of 500 cycles per second. Mechanical sonic generator 12, similar to sonic generator 11, generates sonic energy at a second frequency $f_2$, which is separated from frequency $f_1$ by a predesired transmission frequency. The outputs of mechanical sonic generators 11 and 12 are coupled to mechanical mixer device 16 by means of mechanical coupler devices 13 and 14, respectively.

Mechanical mixer device 16 comprises a nonlinear medium which mixes the two signals received thereby at frequencies $f_1$ and $f_2$ and generates a beat frequency signal at a frequency equal to $f_1 - f_2$. This difference signal 18 which is substantially lower in frequency than $f_1$ and $f_2$ is radiated from mechanical mixer device 16 through the ground 20 until it strikes rock strata 21 from which it is reflected back to the surface. The reflected signals 18a are received by signal detector 22 which may comprise a conventional geophysical transducer and fed from the signal detector to signal correlator 24. A reference detector 23 similar in configuration to signal detector 22 is placed in close proximity to mechanical mixer device 16 and receives unreflected signals 18b directly from mixer device 16. The output of reference detector 23 is fed to signal correlator 24 where the signals received by signal detector 22 are appropriately processed in connection with the reference signals provided by reference detector 23 to provide information as to the nature of the geological strata 21.

In making such an analysis, frequency control means 15 is generally utilized to vary the frequency and/or amplitude of mechanical sonic generator 12 so that a similar variation in the content of transmitted wave 18 will occur, such variation in content aiding in the analysis of the nature of geological strata 21. Signal detector 22, reference detector 23, and signal correlator 24 are well-known components of conventional seismic survey systems and are not the subject of the present invention, this invention being concerned with the means for generating the seismic transmission signal 18.

Referring now to FIGS. 2–4 and 6, a first embodiment of the device of the invention is illustrated. Supported on the surface of the ground is mixer member 27 which may comprise rubber, urethane, or any other material which exhibits nonlinear response characteristics to applied forces. Resting on top of mixer member 27 and preferably attached thereto by any suitable means such as cementing is pedestal member 28 which is preferably fabricated of a material having a relatively high mass and good sonic transmission characteristics such as a suitable metal. Supported on pedestal member 28 are resonant bar members 13, 14a and 14b which are preferably fabricated of an elastic material having high "Q" sonic vibrational characteristics such as steel. Resonant bars 13, 14a and 14b are supported on the pedestal in cylindrical bushings 35 of nonlinear material such as rubber or a suitable resilient plastic. The bar members, bushing members and pedestal member may be joined together in a press-fit.

Supported on the top of resonant bar member 13 and firmly attached thereto, as for example by bolting, are a pair of orbiting-mass oscillator units 12a and 12b. These oscillator units are preferably of the type illustrated in FIG. 7, to be described fully further on in the specification, and include eccentric rotors 40 which are rotatably driven in races formed in housing 41 to generate high-level sonic vibrations. The rotors 40 of oscillators 12a and 12b are phased with respect to each other as indicated in FIG. 2 and are driven in opposite directions at the same rotation speed so that transverse vibrations cancel each other out while vibrations along the longitudinal axis of bar 13 are additive. The speed of rotation of rotors 40 is adjusted to provide resonant vibration of the vibration system including resonant bar 13, thereby affording optimum vibration output. A standing wave vibrational pattern as indicated by graph lines 45 is thus set up in bar 13, such vibration being concentrated along the axis indicated by arrows 43.

Oscillators 12a and 12b are rotatably driven by means of electric motor 50 through gear train 51. The output shaft of motor 50 is coupled to gear train 51 through splined coupler member 54 to provide some degree of play in the drive system so as to avoid undue stress and strain thereon.

Bars 14a and 14b are similar in configuration to bar 13 and are similarly supported on pedestal 28. Resonant bars 14a and 14b are resonantly excited by oscillator units 11a and 11b, respectively, which are fixedly attached to the top portion thereof. Oscillator units 11a and 11b which are similar in configuration to oscillator units 12a and 12b are rotatably driven in opposite directions by means of electric motor 60; oscillator unit 11b being directly driven by the shaft of this motor through splined coupling 63; oscillator unit 11a being driven by means of drive band 65 which drives gear train 66 which in turn drives the oscillator through splined coupling 67. Gear train 66 is rotatably supported on stand 68 which is attached to platform 70.

Referring particularly to FIGS. 3 and 4, motors 50 and 60 are supported on platform 70, platform 70 being supported on legs 72 which are attached to pedestal 28 by means of bolts 75. Vibrational isolation is provided for motors 50 and 60 by rubber bushings 77.

Resonant bars 13, 14a and 14b may be resonantly vibrated at a frequency of the order of 500 cycles per second, the frequency of vibration of either bar 13 or bars 14a and 14b being typically of the order of 20–60 cycles higher in frequency. The rotation speed of either oscillators 11a and 11b or oscillators 12a and 12b can be varied over a range of about 40 cycles by changing the drive motor speed so as to produce a corresponding variation in the output difference frequency developed in mixer member 27. In this manner a low-frequency output signal which is variable over a wide percentage frequency range can be obtained from substantially higher frequency signals by varying one of said signals over a relatively narrow percentage frequency range.

It is to be noted that bushing members 35 provide a nonlinear medium which supplements the mixing action of mixer member 27 and thus increases the effectiveness of such mixing action. In certain applications, however, the use of bushing members 35 may be dispensed with.

Figure 5:
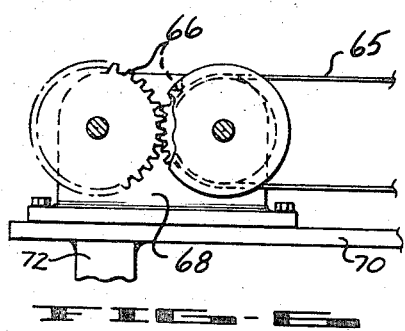
FIG. 5 is an elevation view illustrating a portion of the resonant bar and mixing medium of a second embodiment of the device of the invention.

Referring to FIG. 5, a second embodiment of the device of the invention in which bushings 35 have been eliminated, is shown. In this embodiment, the bar member 13 and bar members 14a and 14b (not shown) are attached directly to pedestal member 28 as for example by a press-fit, the mixing action being accomplished in mixer member 27. This second embodiment is in all other respects identical to the first embodiment described.

Referring now to FIG. 7, the details of construction of an orbiting mass oscillator unit, that may be utilized in the device of the invention for oscillators 11a, 11b, 12a and 12b, are illustrated. Rotor drive member 80 is rotatably mounted in casing 81 on roller bearings 83. Drive member 80 is rotatably driven by means of drive shaft 84 which is attached thereto and which is connected to an appropriate drive motor as indicated in FIG. 4. Drive member 80 has a pair of similar cylindrical portions 85 and 86 near the opposite ends thereof, each of said cylindrical portions having a gear ring 85a and 86a respectively running around the inner wall thereof. Rotor member 88 has a pair of gear rings 88a and 88b which matingly engage gear rings 86a and 85a respectively.

Housing 81 has a pair of gear rings 81a and 81b which matingly engage the teeth of a pair of outer gear rings 88c and 88d respectively on the rotor. Thus, as rotor drive member 80 is rotatably driven by shaft 84, rotor member 88 is driven thereby around an effective bearing race 81c formed in the inner wall of housing 81. The rotation of the rotor generates vibratory forces by virtue of the eccentricity of such rotation with respect to the housing. The frequency of the vibratory forces generated, of course, is a function of the speed of rotation of the rotor. Lubrication for the unit is provided through oil channel 90 formed in the center of rotor drive unit 80.

Referring now to FIGS. 8–10, a third embodiment of the device of the invention is illustrated. In this embodiment, the outputs of the oscillators at a relatively high frequency (of the order of 500 cycles per second) are conveyed some distance below the surface of the ground (of the order of 50–100 feet) in resonant bars in the form of casing members, and the mixing action is accomplished in the earthen material at this subsurface level.

Coupling member 100 has an inner cylindrical casing member 101 threadably attached thereto at threaded portion 100a thereof, and an outer tubular casing member 102 threadably attached thereto at threaded portion 100b thereof. Casing members 101 and 102 are separated from each other by a gap 103 which may be filled with a lubricant such as oil. Concentrically surrounding casing members 101 and 102 is a protective casing 104 which is separated from the outer casing and which is utilized to prevent earthen material from impacting against the walls of casing 102. In certain situations outer casing 104 can be eliminated.

Tightly clamped to the outer wall of inner casing member 101 by means of clamping mechanism 107 is a pair of orbiting mass oscillator units 108a and 108b. These oscillator units may be of the type described in connection with FIG. 7 and have rotors 109 which are rotatably driven in opposite directions. Rotors 109 are phased in the same manner as described in connection with the embodiment of FIG. 2 so as to generate vibrations along the longitudinal axis of casing member 101. A similar pair of oscillator units 110a and 110b are clamped to outer casing 102 by means of clamping mechanism 111, and function in similar manner to generate vibrations along the longitudinal axis of casing member 102. The rotors of oscillator units 108a, and 108b are driven by means of motor 112 through gear train 115 and splined couplings 116. The rotors of oscillator units 110a and 110b are similarly driven by means of motor 118 through gear train 119 and splined couplings 120. Coupler unit 100 is tightly coupled to the earthen material by means of expansible head 100c formed in the end thereof. When the casing members and the coupling member are being driven into position below the surface of the earth, pointed drive member 120 is held within the coupling member in the position indicated by the dotted line. When the final position is reached, drive member 120 is hydraulically driven by an oil jet fed under high pressure into inner casing 101 from a hydraulic source (not shown) coupled to fitting 121. The hydraulic pressure drives drive member 120 downwardly to the indicated position where it expands clamping portion 100c outwardly into firm engagement with the earthen structure. In this manner, very tight coupling is obtained between coupling member 100 and the surrounding earthen material. It is to be noted that generally much better coupling to the ground can be obtained some distance below the surface of the ground than at the surface thereof due to the firmer nature of the earthen material at such subsurface levels.

Oscillator units 108a, 108b and 110a, 110b may be driven at a speed such as to produce vibrational outputs at a frequency of the order of 500 cycles with one of these pair of oscillators being driven at a slightly higher frequency than the other. Means also should be provided to vary the rotation speeds of one of motors 112 and 118 so as to enable a frequency sweep which, as already noted, is necessary for making a proper seismic survey. Thus, with one of the oscillator pairs operating to generate vibrations at a frequency of 500 cycles per second, the other oscillator pair might be operated to generate outputs in the range of 520 to 560 cycles per second, this resulting in a difference frequency output in the earthen structure 20, which provides the mixing action, of between 20 and 60 cycles per second.

Referring now to FIGS. 11 and 12, another embodiment of the device of the invention in which the mixing action is achieved in the ground structure some distance below the surface is illustrated. This second embodiment is similar to the first except that the casing members 101 and 102, rather than being arranged in concentric relationship are arranged side by side to each other in the general configuration of the arms of a tuning fork. As for the first embodiment, oscillator units 108a and 108b and 110a and 110b are utilized to generate sonic energy in casing members 101 and 102 respectively. The oscillator units are similarly driven by motors 112 and 118 through associated gear trains 115 and 119 and splined couplings 116 and 120. The casing members 101 and 102 are firmly joined to the earthen material 20 by means of hydraulically driven drive members 120 in the same manner as described in connection with the previously embodiment. The end portions of casings 101 and 102 are joined together by a metallic web 130. The oscillators are operated in the same manner as described in connection with the previous embodiment to provide a difference frequency signal in the earthen material which may be varied over a frequency range of the order of 20–60 cycles per second.

It is to be noted that in the embodiments of FIGS. 8–12 casing members 101 and 102 are driven as part of resonant vibration systems to obtain maximum vibrational output. These casings are preferably fabricated of a high Q elastic material, such as steel, to further increase the output capabilities so as to assure optimum utilization of the available energy.

The embodiments of FIGS. 8–12 are particularly useful in efficiently coupling energy into the ground in making off-shore seismic surveys. If so desired, a plurality of sunken columns in accordance with the embodiments of FIGS. 8–12 can be utilized to form an array as described in my Patent No. 2,745,507.

Referring now to FIGS. 13 and 14, a further embodiment of the device of the invention is illustrated. This embodiment, except for the mixer device utilized, is quite similar to the embodiment of FIGS. 2–5 and therefore the same numerals are utilized to identify like parts in these two embodiments. Resonant bar members 13 and 14 have orbiting mass oscillator units 12 and 11 attached to the top ends thereof respectively. Orbiting mass oscillators 11 and 12 are rotatably driven by means of motors 60 and 50 respectively to cause resonant vibration of their associated bar members. The output of oscillator 11 is maintained at a fixed frequency which may, for example, be 300 cycles per second, while the output frequency of oscillator unit 12 is at a different frequency which is capable of being varied and which may, for example, be of the order of 320–380 cycles per second. The difference frequency between the two oscillator outputs thus will be between 20 and 80 cycles per second. The structure thus far described is substantially the same as that described in connection with the embodiments of FIGS. 2–5, and therefore the details of such structure need not again be described.

In the embodiment of FIGS. 13 and 14, however, a different type of mixing technique is utilized for generating the difference frequency signal. The mixer device 140 is in the form of a pointed member in the general shape of a cone which is wedged into the surface of the ground 20. Pointed mixer device 140 is comprised of two similar half sections 141 and 142 which are separated from each other by a plurality of cylindrical roller members 143. The roller members are contained between half sections 141 and 142 by means of retainers 144 which are formed in the ends of the half sections. Half sections 141 and 142 are attached to the bottom ends of bar members 14 and 13 respectively, the entire assembly being loosely held together by means of collar members 146 and 147, which loosely fit around bar members 13 and 14. Thus, bar members 13 and 14 are free to move relative to each other and half section 141 is free to move relative to half section 142.

The mixing action to produce an output at the difference frequency is achieved in the following manner: At the output frequencies of oscillators 11 and 12, the vibrational signals transferred to half sections 141 and 142 are out of phase with each other. Thus, when half section 141 is pushing down, half section 142 will be pushing up, the pointed member under such conditions being loosened from the ground with no significant energy transfer thereto. The two half sections move in phase with each other at certain times; a simple wave analysis will show that this in phase motion occurs in a cyclical pattern at the difference frequency between the outputs of oscillators 11 and 12. Thus, half sections 141 and 142 vibrationally move together at the difference beat frequency and in driving together in this fashion will tightly engage the ground to transfer high level vibrational signals thereto at this difference frequency. It is important to note that for proper operation of this embodiment, half sections 141 and 142 have freedom of motion relative to each other along a vertical axis so that the in phase beat signals will properly manifest themselves.

The technique and devices of this invention thus provide means for more effectively delivering vibrational energy into the earth in making seismic surveys. By virtue of the mixing techniques of the invention, the desired frequency sweep ranges can be achieved without a significant sacrifice in optimum resonant operation. Further, such mixing technique enables the minimization of the generation of unwanted signals at the seismic survey frequency by generating signals at such frequency well below the surface from signals at a substantially higher frequency.

While the technique and devices of this invention have been described and illustrated in detail, it is to be clearly understood that this is intended by way of illustration and example only and is not to be taken by way of limitation, the spirit and scope of this invention being limited only by the terms of the following claims.

I claim:

1. In apparatus for making seismic surveys, a device for generating a sonic signal by beat frequency techniques and coupling said signal into the ground comprising:

a first mechanical sonic generator for generating sonic energy at a first frequency, said generator comprising orbiting mass oscillator means, a second mechanical sonic generator for generating sonic energy at a second frequency separated from said first frequency by a predetermined difference frequency, said second generator comprising orbiting mass oscillator means, first and second mechanical coupler devices coupled to receive the vibrational outputs of said first and second oscillator means respectively, said coupler devices being adapted to vibrate resonantly at the output frequencies of their associated oscillator means, and mechanical mixer means coupled to said mechanical coupler devices for mixing the sonic energy output of said coupler devices and producing a signal at said difference frequency, the difference frequency output of said mixer means being transmitted through the ground, said mixer means comprising a member having non-linear response to vibrational forces connected between said coupler devices and the ground.

2. The apparatus as recited in claim 1 wherein said mechanical mixer means comprises a pad member fabricated of a material having non linear response to vibrational forces.

3. The apparatus as recited in claim 1 and additionally including means for varying the frequency of one of said sonic generators over a relatively small percentage frequency range.

4. The apparatus as recited in claim 1 wherein said coupler devices comprise bar members and means for supporting said bar members, said mixer means comprising a pad fabricated of a material having non linear response to vibrational forces, said pad being positioned between said supporting means and the ground surface.

5. The apparatus as recited in claim 4 wherein said supporting means comprises an elongated pedestal member and means for joining one end of each of said bar members to said pedestal member comprising annular bushing means between said pedestal member and each of said bar members, said bushing means having non-linear response to vibrational signals.

6. The apparatus as recited in claim 5 wherein each of said oscillator means is attached to an associated bar member at the end thereof opposite to the pedestal joined end.

7. The apparatus as recited in claim 1 wherein said coupler devices comprise elongated bar members, said bar members being driven into the ground a substantial distance, means for joining together the ends of said bar members remote from the ground surface, and means for coupling said remote ends firmly to the surrounding ground material, said mixer means comprising said surrounding ground material.

8. The apparatus as recited in claim 7 wherein said bar members comprise casing members.

9. The apparatus as recited in claim 8 wherein said means for coupling the ends of the casing members to the surrounding ground material comprises an outwardly expansible coupler member, said coupler member being joined to said casing members, and drive means for expanding said coupler member to cause it to tightly grab said ground material.

10. The apparatus as recited in claim 1 wherein said coupler devices comprise a pair of bar members, said mixer means comprising a pointed member wedged into the ground at the surface thereof, said pointed member comprising a pair of similar half sections, each of said half sections being attached to one end of a separate one of said bar members and a plurality of roller members interposed between the opposing faces of said half sections to provide relative motion between said sections along the vibration axes of the vibrational outputs of the oscillator means, whereby the two half sections vibrate substantially in phase only at the difference frequency to effectively couple sonic energy to the ground at said difference frequency.

References Cited

UNITED STATES PATENTS

| | | |
|---|---|---|
| 2,745,507 | 5/1956 | Bodine _____ 181—.5 |
| 3,244,252 | 4/1966 | Burns. |
| 3,282,371 | 11/1966 | Miller. |
| 3,282,372 | 11/1966 | Brown et al. |
| 3,302,745 | 2/1967 | Ikrath. |

BENJAMIN A. BORCHELT, *Primary Examiner.*

J. FOX, *Assistant Examiner.*